United States Patent [19]

Yoshioka

[11] 3,925,127

[45] Dec. 9, 1975

[54] BULKY PAPER AND METHOD OF MAKING SAME

[75] Inventor: Yoshihide Yoshioka, Kawanoe, Ehime-ken, Japan

[73] Assignee: Gomei Kaisha Touyo Shoji, Japan

[22] Filed: June 26, 1974

[21] Appl. No.: 483,295

[30] Foreign Application Priority Data

July 9, 1973 Japan .............................. 48-77210

[52] U.S. Cl. .................... 156/85; 15/445; 156/183; 156/290; 156/309; 428/101; 428/131; 428/138; 428/134; 428/154; 428/201; 428/211; 428/305; 428/318; 428/337; 428/340; 428/339; 428/476; 428/481; 428/514

[51] Int. Cl.$^2$.. B32B 3/10; B32B 7/10; B32B 31/08; B32B 31/26

[58] Field of Search ............ 156/85, 183, 290, 309; 161/109, 112, 129, 148, 156, 159, 229, 232, 250; 15/445; 428/101, 131, 134, 138, 154, 201, 211, 305, 318, 337, 339, 340, 476, 481, 514

[56] References Cited

UNITED STATES PATENTS

| | | | |
|---|---|---|---|
| 3,025,199 | 3/1962 | Harwood | 161/129 |
| 3,424,643 | 1/1969 | Lewis et al. | 161/129 |
| 3,446,852 | 9/1969 | Stoner | 161/250 |
| 3,505,083 | 4/1970 | Schelhorn | 161/250 |
| 3,530,023 | 9/1970 | Schutte et al. | 161/148 |
| 3,546,056 | 12/1970 | Thomas | 161/129 |
| 3,615,976 | 10/1971 | Endres | 161/129 |
| 3,650,882 | 3/1972 | Thomas | 161/129 |
| 3,672,950 | 6/1972 | Murphy et al. | 161/129 |
| 3,684,643 | 8/1972 | Stepp | 161/250 |
| 3,687,797 | 8/1972 | Wideman | 161/129 |

FOREIGN PATENTS OR APPLICATIONS

| | | | |
|---|---|---|---|
| 68-17873 | 6/1970 | Netherlands | 156/85 |

*Primary Examiner*—William J. Van Balen
*Assistant Examiner*—J. Cannon
*Attorney, Agent, or Firm*—Toren, McGeady and Stanger

[57] ABSTRACT

A bulky paper having sufficiently high bulkiness and strength as well as a good dimensional stability is provided by inserting a plastic film between a pair of crepe papers, and passing the assembly through the nip of heated embossing rolls to cause a partial adhesion of the plastic film with the crepe papers. Thereafter, the paper may be moistened to extend the crepe and the composite heated to shrink and/or melt the film to form perforations therein. The perforations reduce the noisiness of the composite when it is used as a towel or wipe.

6 Claims, 7 Drawing Figures

FIG I
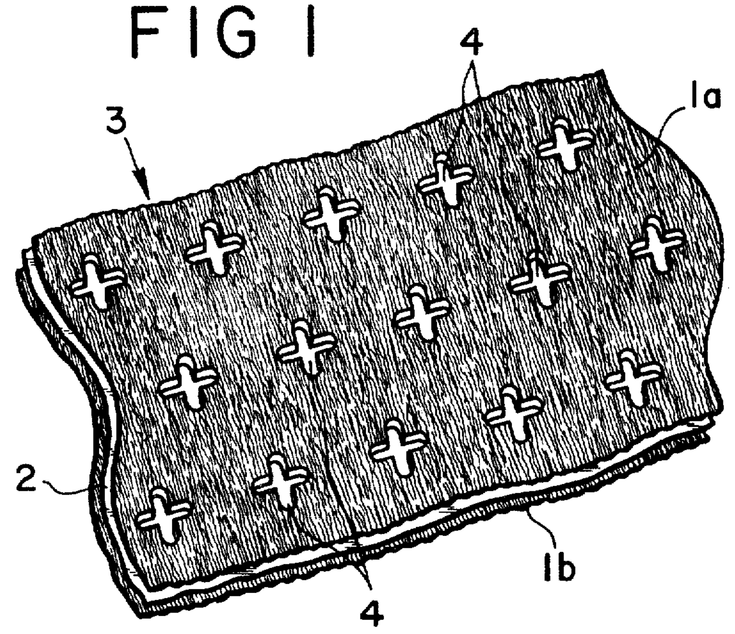
FIG 7
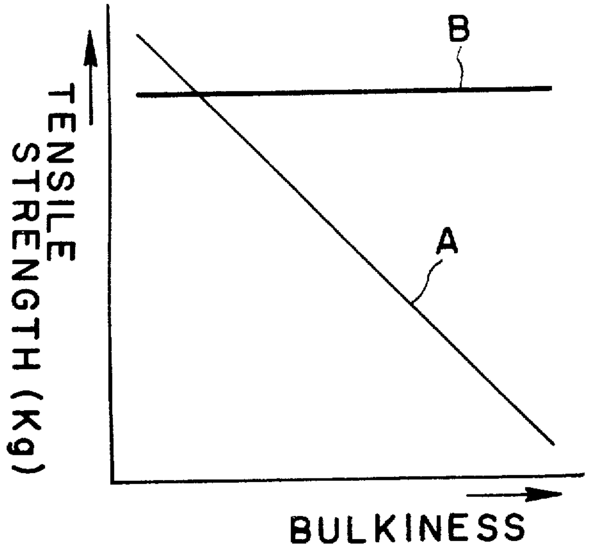

BULKY PAPER AND METHOD OF MAKING SAME

BACKGROUND OF THE INVENTION

The invention relates to a bulky paper and a method of making same, and more particularly to a bulky paper having a plastic film laminated therein to provide sufficiently high bulkiness and strength as well as good dimensional stability.

Bulky paper is already known and finds an extensive application, for example, as towels, either dry or impregnated with cold or hot water, chemical swabbing cloths, impregnated with oil, sanitary tissues impregnated with disinfectant as well as buffering materials for packaging purposes. In one example, a conventional bulky paper comprises a paper which has been manufactured by mixing synthetic fibres having the properties to shrink upon application of heat, moisture or both, the shrinkage of the synthetic fibres imparting a bulkiness to the overall paper assembly. A bulky paper obtained in this manner may have insufficient adhesion or bonding between the fibres contained therein to result in a poor strength, even though it may have a high bulkiness by virtue of the freely shrinkable nature of the synthetic fibres when treated with heat, moisture or both. On the other hand, where the adhesion or bonding between the fibres of the composite paper is sufficient, the synthetic fibres may be prevented from being freely shrinkable upon treatment with heat, moisture or both to result in a poor bulkiness, even though the strength of the paper may be satisfactory. Thus, it has been difficult in the prior art practice to produce a bulky paper which is staisfactory in respect of both the bulkiness and strength.

SUMMARY OF THE INVENTION

It is a first object of the invention to provide a bulky paper having sufficiently high bulkiness and strength as well as good dimensional stability by inserting a plastic film between a pair of crepe papers, and passing the assembly through the nip between a pair of heated embossing rolls to cause a partial adhesion of the plastic film to the crepe papers.

It is a second object of the invention to provide a bulky paper of above mentioned nature while removing rattling offensive to the ear which inherently occurs due to the presence of the plastic film when it is used as a towel or towelette, for example.

The above and other objects, features and advantages of the invention will be apparent from the following detailed description of the invention with reference to the drawings.

BRIEF DESCRIPTION OF THE DRAWINGS

FIG. 1 is a schematic perspective view, to an enlarged scale, of portion of a bulky paper according to a first embodiment of the invention;

FIG. 7 graphically shows the relationship between the strength and the bulkiness of the bulky paper according to the invention in comparison with that of a conventional bulky paper.

DETAILED DESCRIPTION OF EMBODIMENTS

Figure 2:
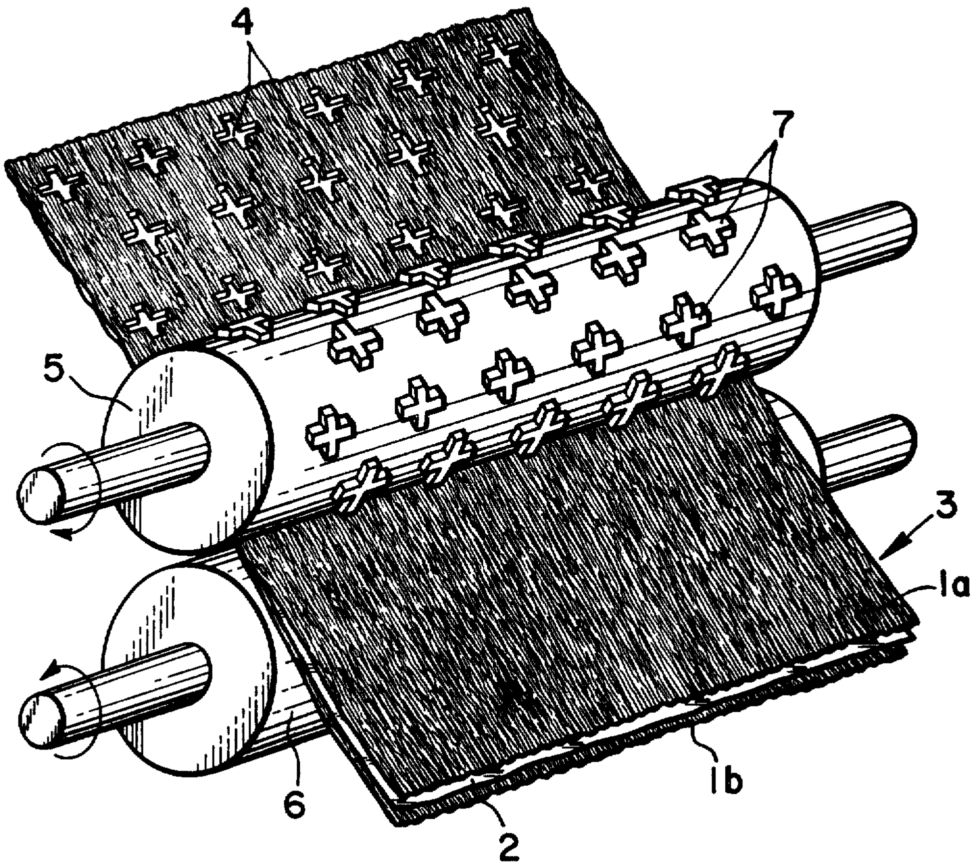
FIG. 2 is a schematic perspective view of the embossing apparatus used to prepare the bulky paper of the invention.

Several embodiments of the invention will be more specifically described below with reference to the drawings, and it is to be understood initially that four kinds of bulky papers are provided in accordance with the invention. The first bulky paper is prepared by inserting a plastic film between a pair of crepe papers, and passing the assembly through the nip between a pair of heated embossing rolls to cause a partial adhesion of the plastic film with the crepe papers. This represents the basic product according to the invention, which is made the basis of all subsequent bulky papers to be described. The first bulky paper is characterized by its high bulkiness which increases with the crepe ratio of the crepe papers, and also by a good dimensional stability owing to the fact that the plastic film is interposed between and bonded to the crepe papers.

The second bulky paper is produced by supplying moisture to the crepe papers of the first bulky paper to extend the crepe, whereupon it is dried at a temperature which does not modify the plastic film. This second bulky paper is characterized by a higher bulkiness as compared with the first bulky paper as well as its dimensional stability which is as good as that of the first bulky paper.

The third bulky paper is produced by thermally treating the first bulky paper to cause a shrinkage and/or melting of the plastic film which is interposed between the crepe papers. The third bulky paper is characterized by its bulkiness which is higher than that of the first bulky paper as a result of the shrinkage of the plastic film. The melting of the plastic film causes it to fuse partially with the crepe papers, thus losing the film configuration, and removing the rattling which inherently occurs due to the presence of the plastic film. This avoids objectionable noises offensive to the ear when it is used as a towel or towelette. As compared with the first bulky paper, the dimensional stability is as good.

The fourth bulky paper is produced by supplying moisture to the crepe papers of the first bulky paper to extend the crepe, followed by a thermal treatment to cause a shrinkage and/or melting of the plastic film interposed between the crepe papers. The fourth bulky paper is characterized by a bulkiness which is higher than any of the first to third bulky papers. In addition, the plastic film is melted and thus converted into a network configuration, whereby the rattling is eliminated as in the third bulky paper with concomitant advantages. As compared with the first bulky paper, the dimensional stability is as good.

One of the most important features of the crepe papers used in the invention is its crepe ratio, which must be in excess of 10%, preferably in excess of 40%. Below 10%, a satisfactory bulkiness effect is achieved. When bi-directionally creped papers, as disclosed in Japanese Patent No. 652,380 issued July 17, 1972 and entitled "A method of forming three-dimensional crossing crepes in a paper" is used, an enhanced bulkiness effect is obtained. A suitable basis weight for the crepe papers to be used in the invention ranges from 10 to 100 g/m², and when it is desired to obtain a pliable bulky paper, it is preferred to use two or more thinner papers rather than a single thick paper. Where a wet strength is required in the bulky paper, crepe papers may be used which have been produced by addition of a suitable ammount of wet strength improving resin, such as, one sold by Hercules Company, State of Delaware, under the tradename "Kymene 557", or the like. Where a high pliability is desired, artificial fibres, such as, rayon, vinylon and/or nylon may be mixed in the process of paper manufacturing. The crepe papers can be suitably modified depending on the intended application, and crepe papers having a high water absorbability may be used when the bulky paper of the invention is to be used as a towel or towelette, for example.

The plastic film which may be used in the invention includes films of thermoplastic synthetic resins, such as, polyolefins, polyvinyl chloride, polyvinylidene chloride, polyamide, polyester and the like, but polyethylene film is preferred in view of its low cost and low melting temperature. However, where a sterilization of a vacuum packed bulky paper is required as when the bulky paper is used as a cleaning fabric, and the sterilization must be effected by application of heat, it will be appreciated that the polyethylene film has an excessively low melting temperature for such application, so that polypropylene film or some other film having a higher melting temperature must be used. Nevertheless, it should be understood that a plastic film having an unduly high melting temperature is not suitable if the plastic film is to be subjected to shrinkage and/or melting by the thermal treatment, as will be described later. Generally, the plastic film has a thickness between 3 and 100 microns. The thinner the thickness of the film, the more pliable the bulky paper becomes, but the contribution of the plastic film to increasing the strength of the bulky paper is reduced. On the contrary, an increasing thickness of a film improves its contribution to the strength of the bulky paper, even though the pliability of the latter is reduced. The choice of a particular film thickness depends on the required pliability and strength of the ultimate bulky paper.

In producing the bulky paper according to the invention, the manner of adhesion between the crepe papers and the plastic film has a great significance. If the crepe papers and plastic film were bonded together over their entire surface, no bulkiness effect results, so that it is essential that the adhesion takes place only partially, for example, in the form of dots, lines and/or curves. Such an adhesion is accomplished by passing the assembly comprising the crepe papers with the plastic film interposed therebetween through the nip of a pair of heated embossing rolls having engravings in the form of dots, lines and/or curves to cause a partial adhesion of the crepe papers with the plastic film in conformity to the configuration of the engravings. The temperature to which the embossing rolls are heated depends on the variety of the plastic film used and the speed of the embossing step, the only requirement being that a sufficient adhesion is established between the plastic film and the crepe papers. When laminating the crepe papers and plastic film, the basic lamination would be placing each crepe paper on either side of a single plastic film. However, two crepe papers may be placed on either surface of the single plastic film, resulting in a composite of five laminae. Alternatively, a single crepe paper may be placed on one side of a single sheet of plastic film and two placed on the other side thereof. As a further alternative, two sheets of plastic films and three crepe papers may be alternately laminated.

In the process of lamination, the direction of crepe in the crepe papers may be aligned with the direction of stretching of the plastic film, or may be disposed perpendicular to the latter. In these respective instances, the shrinkage of the film upon thermal treatment results in differential bulkiness, and this fact may be utilized to advantage in providing bulky papers having various degrees of bulkiness.

The first bulky paper according to the invention can be produced in the manner mentioned above. Specifically, referring to FIG. 1, 1*a* and 1*b* represent crepe papers and 2 is plastic film which is interposed between or laminated with the crepe papers 1*a*, 1*b*. The crepe papers 1*a*, 1*b* and the plastic film 2 are not bonded together over the entire surface, but are bonded together in the form of dots 4, thus forming an assembly 3 which constitutes the first bulky paper according to the invention.

FIG. 2 shows a specific apparatus which is suitable to produce the bulky paper of the first embodiment. In the example shown, the assembly 3 is passed through the nip between a pair of embossing rolls 5 and 6, and is delivered to a take-up device or receptacle, not shown. The roll 5 is formed with a relief in the form of dot-shaped projections 7, while the roll 6 may have a smooth surface. The roll 5 is heated indirectly by suitable means, not shown, which may be a heating medium, such as "DOWTHERM A" commercially available from The Dow Chemical Co., State of Michigan. The rolls 5 and 6 are held under pressure to apply a suitable pressure to the assembly 3 passed therebetween. The adjustment of the pressure may be performed by means as used in the art of calendering or strip mill. The embossing process itself is known, and is described, for example, in "DISPOSABLE SOFT GOODS" issued by Pamarco, Inc., State of New Jersey, September 1972, pages 24, 25 and 32 under the title of embossing. While the assembly 3 passes through the nip between the rolls 5 and 6, it is embossed in conformity to the configuration of the projections 7 formed on the roll 5, and the plastic film 2 melts where the assembly is embossed, thereby bonding with the crepe papers 1*a* and 1*b*. In this manner, the first bulky paper of the invention is formed.

Figure 3:
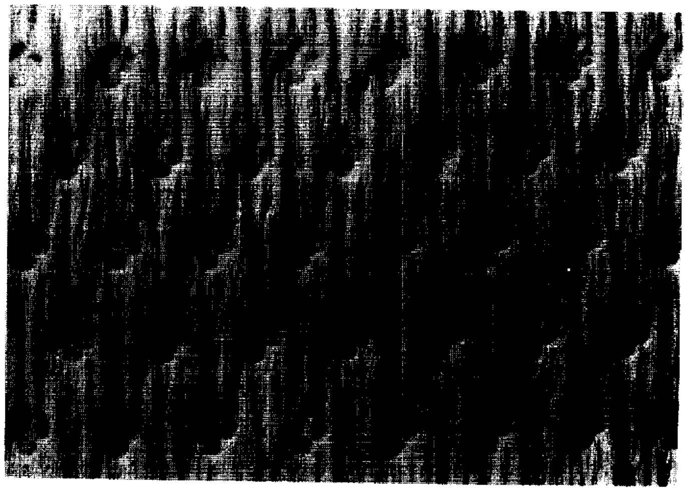
FIG. 3 is a photograph, illustrating to an enlarged scale portion of a bulky paper according to a second embodiment of the invention.

The second bulky paper according to the invention is produced by working the bulky paper of the first embodiment in the following manner: moisture is supplied to the crepe papers 1*a* and 1*b* of the first bulky paper to extend the crepe thereof, and is then dried at a temperature at which the plastic film 2 interposed between the crepe papers 1*a* and 1*b* is not altered. This treatment results in an expansion of the papers intermediate the bonded points 4 as a result of an extension of the crepe in the crepe papers 1*a* and 1*b*, thereby increasing the bulkiness (see FIG. 3). As will be apparent from FIG. 3, the bulky paper of the second embodiment is characterized in that the papers are inflated intermediate the bonded points to increase the bulkiness. When supplying moisture to the crepe papers, the necessary minimum amount should be sprayed. If the starting paper is impregnated with water, an excessive amount of water may cause a loss of the bulkiness which has been imparted to the paper by the moisture.

Figure 4:
FIG. 4 is a photograph showing a portion of a bulky paper according to a third embodiment of the invention, with substantially the same magnification as that of FIG. 3.

When producing the third bulky paper according to the invention, the first bulky paper is subjected to a thermal treatment by hot air, radiation heat or otherwise, without damaging the crepe papers 1*a* and 1*b*, to cause a shrinkage and/or melting of the plastic film 2 interposed between the crepe papers. Since the thermal treatment causes an overall shrinkage of the first bulky paper, a free shrinkage of the entire bulky paper must be permitted by the provision of a suitable apparatus, such as, a hot air drier with overfeed. In one example, this thermal treatment results in a shrinkage of about 10% longitudinally of the first bulky paper or in the direction of stretching of the plastic film, with consequent increase in its bulkiness (see FIG. 4). In addition, the plastic film is partially fused with the crepe papers at locations other than the initial bonded points 4 and is also irregularly perforated to lose its film configuration, thereby eliminating the rattling inherent to the plastic film which may be offensive to the ear when the resulting bulky paper is used as a towel or towelette, for example. The increased bulkiness and the elimination of rattling are the features characteristic to the bulky paper according to the third embodiment. It will be appreciated that the thermal treatment takes place at a temperature which is sufficient to cause a shrinkage and/or melting of the plastic film used.

Figure 5:
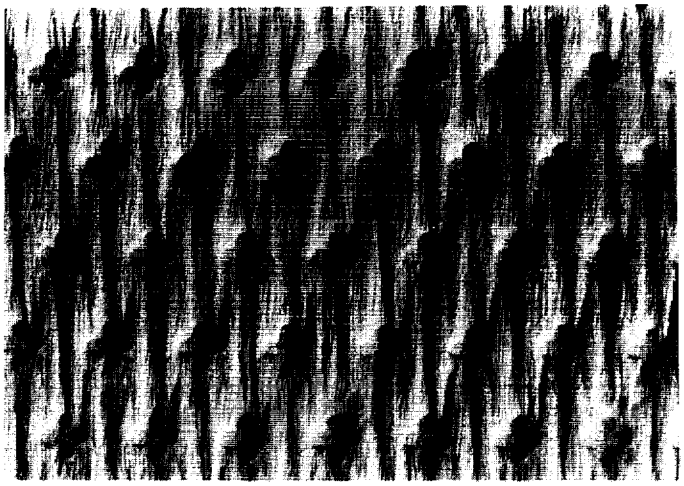
FIG. 5 is a photograph illustrating a portion of the bulky paper according to a fourth embodiment of the invention, with substantially the same magnification as that of FIG. 3.
Figure 6:
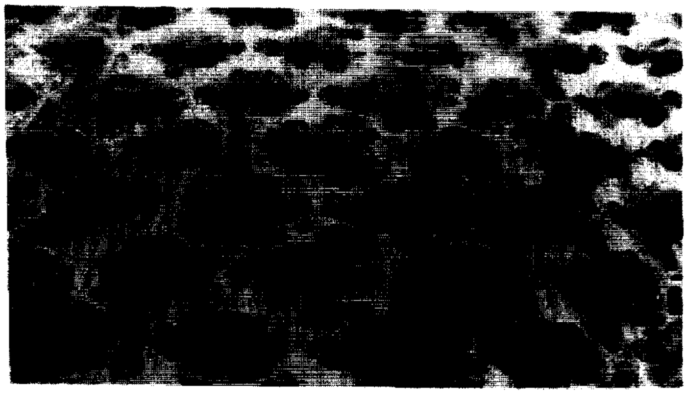
FIG. 6 is a photograph showing, with substantially the same magnification as that of FIG. 3, the plastic film of the bulky paper according to the fourth embodiment of the invention as it is converted into a network configuration.

The fourth bulky paper according to the invention is produced by initially supplying a moisture to the crepe papers 1*a* and 1*b* of the first bulky paper to extend the crepe in the same manner as in the second embodiment, and then thermally treating the resulting paper in the same manner as in the third embodiment to cause a shrinkage and/or melting of the plastic film interposed between the crepe papers 1*a* and 1*b*. In one example, these treatments result in a shrinkage of about 20% longitudinally of the first bulky paper on in the direction of stretching of the plastic film. It is believed that a shrinkage of about 20%, which is as high as twice that produced upon thermal treatment of the third embodiment, results from the fact that a moisture is supplied to the crepe papers prior to the thermal treatment so that the crepe papers remain pliable and freely shrinkable as the plastic film shrinks. The inflation of the papers as a result of extended crepes in the crepe papers 1*a* and 1*b* as well as the shrinkage of the plastic film 2 serves to considerably increase the bulkiness (see FIG. 5). In addition, the thermal treatment mentioned above also causes the plastic film to be deformed into a network configuration at portions other than the bonded points with the crepe papers 1*a* and 1*b*, thereby eliminating the rattling mentioned above. The formation of the network configuration is believed to result from the presence of moisture in the crepe papers during the thermal treatment, which prevents a fusion of the plastic film with the crepe papers, allowing the plastic film alone to gather together to form the network configuration. Throughout the specification and claims, the term "network configuration" refers to the structure which results when the plastic film is irregularly perforated at portions other than the bonded points (indicated by numeral 4 in FIG. 1) as a result of shrinkage and/or melting of the plastic film during the thermal treatment, as indicated in FIG. 6. The fourth bulky paper is characterized by its highly increased bulkiness and the elimination of rattling.

FIG. 7 is a graph showing the experimental results demonstrating the relationship between the bulkiness on the abscissa and the tensile strength (kg) on the ordinate for a conventional product (curve A) and for the product of the invention (curve B). The bulkiness is defined as 1/(apparent specific gravity). It will be noted that the conventional bulky paper has the disadvantage that an increased bulkiness results in a reduced tensile strength, whereas in the bulky paper of the invention, the bulkiness can be increased without any reduction in the tensile strength.

Since the crepes in the crepe papers are fixed in position by means of the plastic film, no dimensional change occurs in the bulky paper of the invention when it is subjected to a moisture or wetting by water, thus obtaining a good dimensional stability.

In order to further illustrate the manner of carrying out the invention, specific examples are given below. However, it should be understood that the invention is in no way limited to these examples.

EXAMPLE 1

A pair of crepe papers formed of 100% pulp and having a crepe ratio of 50% and a basis weight of 25g/m$^2$ is used, and a 15 micron thick polyethylene film manufactured by the T-shaped die process in the same size as the crepe papers are laminated therewith. One of the embossing rolls comprises a steel roll having a diameter of 15 cm and a length of 50 cm and formed with a relief pattern of cruciform projections measuring 5 mm long and 2 mm wide, with a spacing of 1 cm on centers, and the other embossing roll is formed by a hard rubber roll having a diameter of 15 cm and a length of 50 cm. The assembly comprising the crepe papers with the interposed polyethylene film is passed between these embossing rolls under a pressure of 10 kg/cm$^2$ while maintaining the rolls at a temperature of 170°C and rotating them with a rotational speed of 21 rpm, thereby causing an adhesion of the polyethylene film to the crepe papers at spaced points to produce the bulky paper of the invention. The bonding takes place in the cruciform configuration at a rate of nearly 700 per 30 cm$^2$.

EXAMPLE 2

The bulky paper obtained in Example 1 is sprayed on both surfaces with water at a rate of 100 ml/m$^2$ and dried for about four minutes by a hot air drying machine maintained at a temperature of about 130°C, thereby producing the bulky paper according to the invention.

EXAMPLE 3

The bulky paper obtained in Example 1 is subjected to a thermal treatment by the hot air drying machine maintained at about 130°C for three minutes, thereby producing the bulky paper according to the invention.

EXAMPLE 4

The bulky paper obtained in Example 1 is sprayed with water on its both surfaces as in Example 2, and subsequently subjected to a thermal treatment similar to Example 3, thereby producting the bulky paper according to the invention.

Having described the invention, what is claimed is:

1. A method for producing a bulky paper comprising the steps of inserting a plastic film between a pair of crepe papers, passing the assembly through the nip of a pair of heated embossing rolls to cause a partial adhesion of the plastic film with the crepe papers, subsequently moistening the crepe papers to extend the crepe, and then subjecting the assembly to a thermal treatment to cause a shrinkage or melting of the plastic film and the formation of a network configuration therein.

2. The method according to claim 1 in which the plastic film comprises a thermoplastic resin selected from the group consisting of polyvinylidene chloride, polyamide, and polyester resin, and has a thickness between 3 and 100 microns.

3. The method according to claim 1 in which the crepe papers have a crepe ratio in excess of 10% and a weight of 10 to 100 $g/m^2$.

4. The method according to claim 1 in which the crepe papers have a high water absorbability.

5. A method according to claim 1 in which in the process of manufacturing the crepe papers, a resin for improving the wet strength of the ultimate crepe papers is added.

6. The bulky paper obtained by the process of claim 1.

* * * * *

UNITED STATES PATENT OFFICE

CERTIFICATE OF CORRECTION

Patent No. 3925127 Dated December 9, 1975

Inventor(s) Yoshihide Yoshioka

It is certified that error appears in the above-identified patent and that said Letters Patent are hereby corrected as shown below:

In the heading of the Patent [73] and [30] should read as follows:

--[73] Gomei Kaisha Touyo Shoji, Ehime-ken, Japan--,

| | | |
|---|---|---|
| --[30] | July 9, 1973 | Japan............48-77210 |
| | July 9, 1973 | Japan............48-81260 |
| | July 20,1973 | Japan............48-81662 |
| | July 20,1973 | Japan............48-81663--. |

Signed and Sealed this

*second* Day of *March 1976*

[SEAL]

*Attest:*

RUTH C. MASON
*Attesting Officer*

C. MARSHALL DANN
*Commissioner of Patents and Trademarks*